United States Patent [19]
Knight

[11] Patent Number: 5,251,749
[45] Date of Patent: Oct. 12, 1993

[54] MULTIPLE MEDIA STORAGE CONTAINER AND SYSTEM

[76] Inventor: Eric A. Knight, 17154 Palisades Cir., Pacific Palisades, Calif. 90272

[21] Appl. No.: 783,375

[22] Filed: Oct. 28, 1991

[51] Int. Cl.⁵ .................. B65D 85/57; B65D 85/575
[52] U.S. Cl. ................................ 206/309; 29/428; 53/452; 206/387; 220/4.01
[58] Field of Search ............................ 206/307–313, 206/387, 444; 220/4.01, 4.26–4.28; 312/107; 29/428; 53/452

[56] References Cited

U.S. PATENT DOCUMENTS

| | | | |
|---|---|---|---|
| 3,830,363 | 8/1974 | Liber | 206/387 |
| 4,089,464 | 5/1978 | Teti, Jr. et al. | 220/4.01 |
| 4,426,056 | 1/1984 | Gelardi et al. | 206/387 |
| 4,440,458 | 4/1984 | Berkman | 206/387 |
| 4,838,422 | 6/1989 | Gregerson | 206/387 |
| 4,934,531 | 6/1990 | Chen | 220/4.28 |

FOREIGN PATENT DOCUMENTS

| | | | |
|---|---|---|---|
| 0236854 | 3/1964 | Austria | 220/23.4 |
| 3522252 | 1/1987 | Fed. Rep. of Germany | 206/387 |
| 6516181 | 8/1966 | Netherlands | 220/23.4 |
| 2077234 | 12/1981 | United Kingdom | 206/387 |

*Primary Examiner*—Jimmy G. Foster
*Attorney, Agent, or Firm*—Lyon & Lyon

[57] ABSTRACT

An interlocking storage system for different types of electronic or magnetic recording media, including compact discs and cassette tapes. A standard size module is provided which can accommodate and store one standard dual compact disc box and one single compact disc box, three single compact disc boxes or two standard audio cassette boxes. Alternatively, other selected electronic recording media may be stored. The user selects releasable left and right side elements which securely compartmentalize the selected recording media within the module. This module provides both a horizontal and vertical interlocking means so that users may utilize numerous modules which are interconnected in both the vertical and horizontal direction to form a freestanding modular cabinet or storage system for their home entertainment collection.

15 Claims, 3 Drawing Sheets

MULTIPLE MEDIA STORAGE CONTAINER AND SYSTEM

BACKGROUND OF THE INVENTION

1. Field of the Invention

The field of the present invention is storage containers and systems for electronic or magnetic recording media, including compact discs and audio cassette tapes.

2. Scope and Content of the Prior Art

The use of compact discs ("CD's") in new technologies for home entertainment is proliferating. One of the most recent advances is called CD-TV, which allows users to view images stored on compact disc directly on their television screens. A new technology allows consumers to have their photographs electronically stored on a compact disc for viewing on the CD-TV system. Another manufacturer has introduced an electronic encyclopedia on compact disc. Current plans have other manufacturers putting their popular home computer games on compact discs.

With this advent of the compact disc as a popular medium for electronic recording, their storage has created a problem for consumers, as their size is not compatible with existing album, cassette tape or audio tape storage devices. Also, these now-familiar five inch discs are available in either a single box or a dual box size, such that a cost-effective storage container must accomodate both.

Consumers today not only have compact discs in their collections, but also have cassette tapes. A visit to any record shop reveals that consumers are still purchasing large numbers of cassettes to add to their collection. On top of this, the burgeoning home electronics industry is producing other recording media, such as video tape and digital audio tape. There is a particular need for a common storage system for home use where the consumer's collection is very likely to contain a large and diverse collection of these recording media.

Conventional storage systems are designed to store only one type of media and therefore require consumers to purchase more than one storage system. Some conventional systems are complicated and awkward to use because they contain too many moving parts. For example, at least one of these conventional systems utilizes an awkward drawer assembly to store the electronic media. Another device incorporates a gate which rotates when the device is opened. Yet another system requires an indicator device to tell the user if a cassette or compact disc is occupying the closed container. These systems can be surprisingly expensive.

Other systems that are designed to store compact disc boxes do not securely hold both the dual and single compact discs nor can they hold other types of recording media. Similarly, conventional cassette tape storage systems are not capable of continuously adapting to the changing collection of the consumer, should his or her collection of compact discs grow significantly larger and audio cassettes lose their popularity. The need to purchase incompatible storage systems only exacerbates their high cost.

Therefore, a need was perceived for an interlocking, easy-to-use system for storing different types of recording media, including both single and dual compact disc boxes with audio cassette tape boxes, in one inexpensive system.

SUMMARY OF THE INVENTION

This invention relates to an interlocking container and system for the storage of recording media, including compact discs and cassette tapes. The invention herein described may also be used to store digital audio tape, video tape and computer storage discs. One of the hallmarks of the present invention is the standard sized module used to accommodate a varied collection of recording media. The modules may then be connected together in both the vertical and horizontal directions to form one interconnected system which conveniently stores an individual's home entertainment collection, and "grows" as the collection grows.

The preferred embodiment allows individuals to store both compact discs and cassette tapes in one orderly storage system. The module is constructed of a cap and bottom which are connected together by removable right and left elements. The elements provide the separate interchangeable shelves on which a compact disc or cassette tape are stored compartmentally at a different level in the module. The module may be adapted to store three single compact discs by the addition of a removable shelf or shelves into the module. The compact discs are securely positioned within the module by a series of biased spring means, which are biased inwardly to be in contact with the compact discs when they are placed in the module.

Alternatively, a cassette insert is attached to the right and left inserts which adapts the module to store two standard audio cassette tapes. A second set of biased spring means is also provided to secure the audio cassettes in the module. End stops are provided to adjust for the shorter length of the audio cassettes.

The module is also provided with a quick and easy to use means to interconnect horizontally to an adjacent module. In the preferred embodiment, a channel is placed on the left exterior side of the module and a rail means is located on the right side which will slidably fit into the channel on an adjacent module. The module is also provided with means to interconnect vertically with adjacent module. In the preferred embodiment, a series of grooves and T-shaped projections vertically connect the modules. The grooves are located on the exterior surface of the cap which mesh with the T-shaped projections from a module disposed immediately above. A plurality of flanges positioned at various points along the grooves will secure the modules together vertically.

One embodiment has a lip positioned around the peripheral edge of the front aperture which also secures the selected electronic media within the module. Another embodiment utilizes a unitary plastic module in place of the module made up of numerous components.

Accordingly, it is an object of the present invention to provide an interconnecting multi-media storage box and interconnected storage system. Other and further objects and advantages will appear hereinafter.

DETAILED DESCRIPTION OF THE PREFERRED EMBODIMENT

Figure 1:
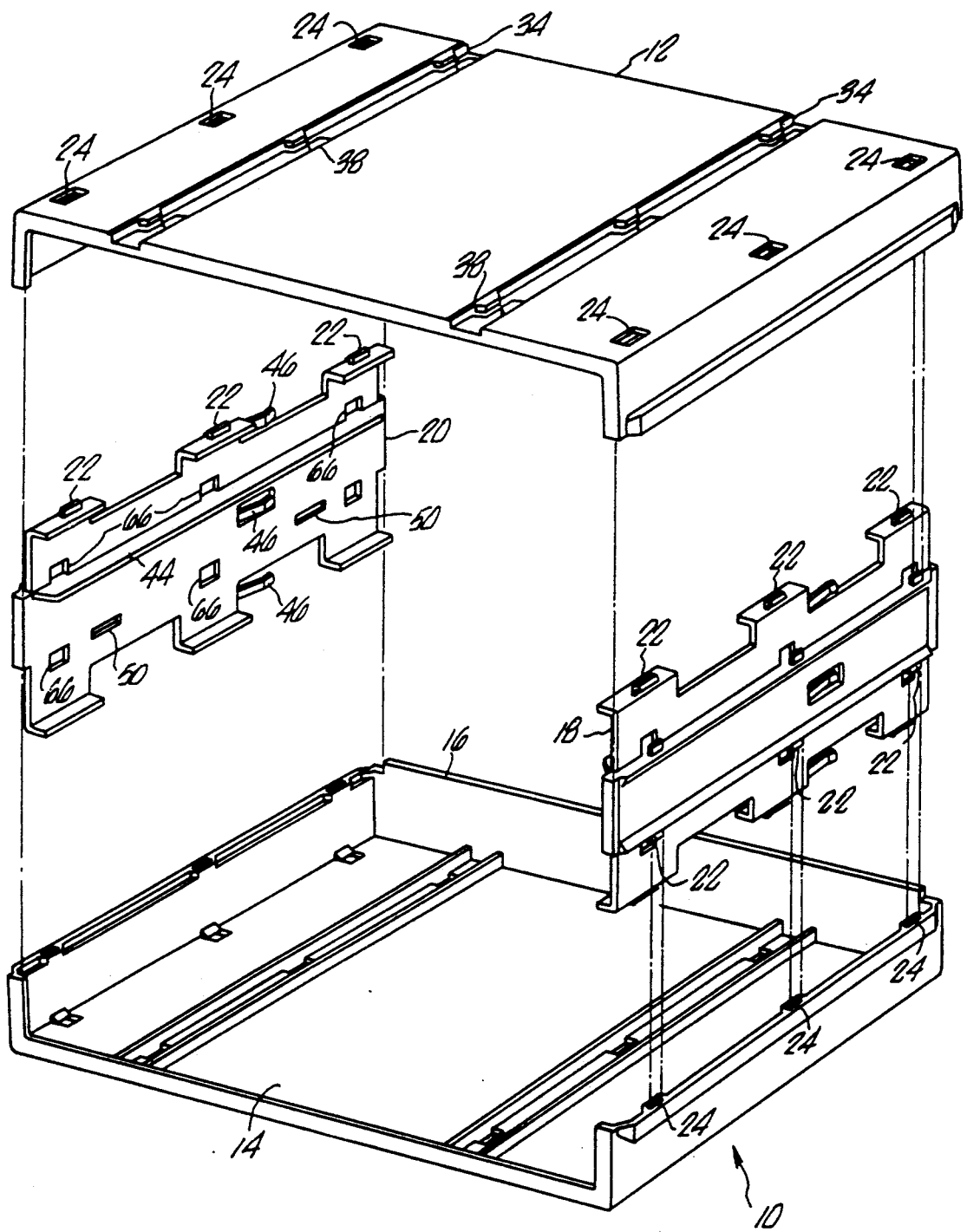
FIG. 1 is an exploded view of the module showing the cap, bottom, and right and left elements.
Figure 2:
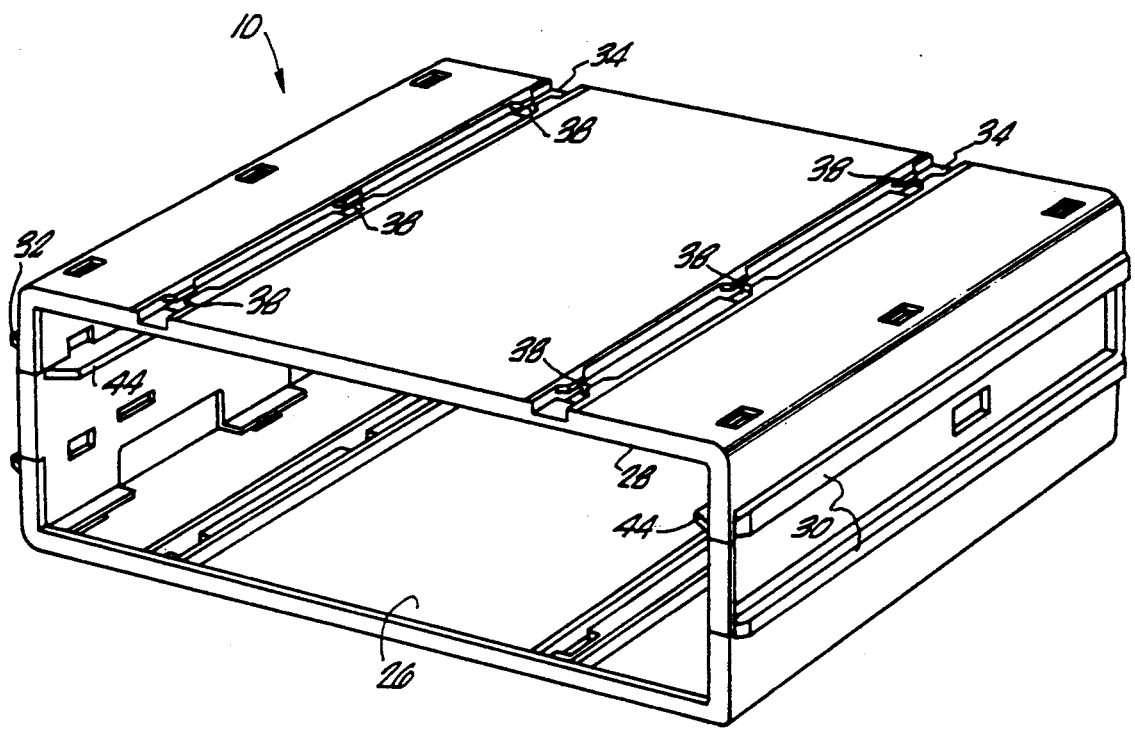
FIG. 2 is a view of the assembled module accommodating the storage of one single compact disc box and one dual compact disc box.
Figure 8:
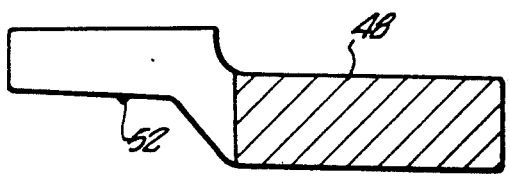
FIG. 8 is a section view taken along line 8—8 in FIG. 7 showing the rib on the removable shelf.

Referring to the Figures, the multiple media storage container and interconnecting system is shown. The standard sized module 10 is shown in an exploded view in FIG. 1 and in its assembled state in the preferred embodiment in FIG. 2. The module 10 is assembled from the cap 12 and the bottom 14 which together form the back wall 16. The sides of the module 10 are formed by connecting the right element 18 and the left element 20 to the cap 12 and bottom 14 by a series of connectors 22 and receiving ports 24. This is shown in FIG. 1. The various electronic media are inserted into the module through the front aperture 26. In the preferred embodiment as illustrated in FIGS. 1 and 2, a lip 28 surrounds the front aperture 26. Within the scope of this invention is the use of a module 10 made of a unitary molded plastic piece in place of the various aforementioned components.

Figure 3:
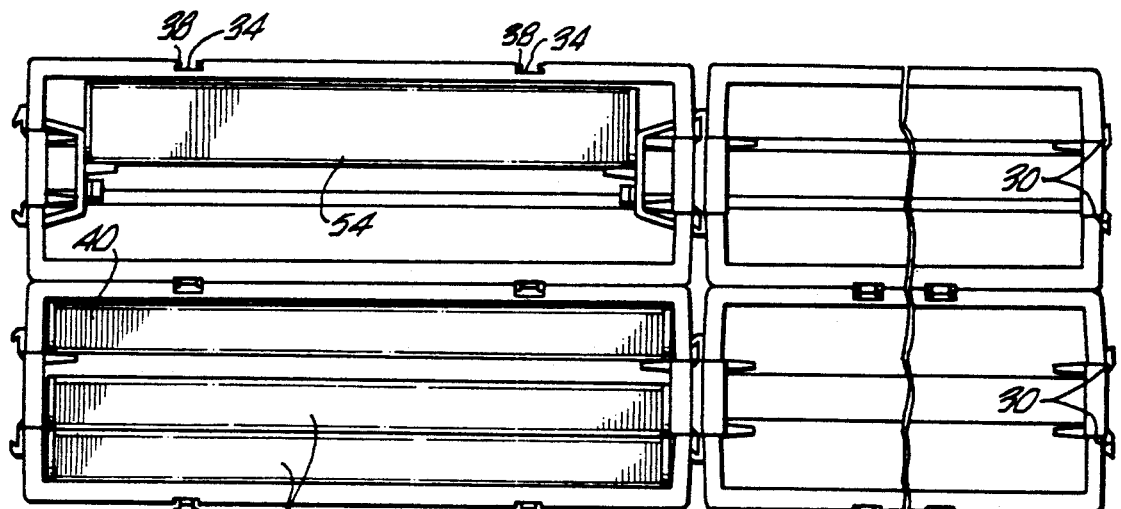
FIG. 3 illustrates the vertical and horizontal interconnecting means of the present invention, the compact disc boxes and an audio cassette tape box.

The interconnected media storage system is formed by connecting together numerous modules 10 in both the horizontal and vertical directions by a horizontal and vertical interconnecting means which is illustrated in FIG. 3. As shown in FIGS. 1 and 2, the modules 10 may be horizontally interconnected relative to one another by a rail means 30 positioned on one lateral side of the module 10 which engages a complementary channel 32 on the opposing lateral side of an adjacent module 10 by simply sliding the rail means 30 into the channel 32 on the adjacent module 10.

Figure 4:
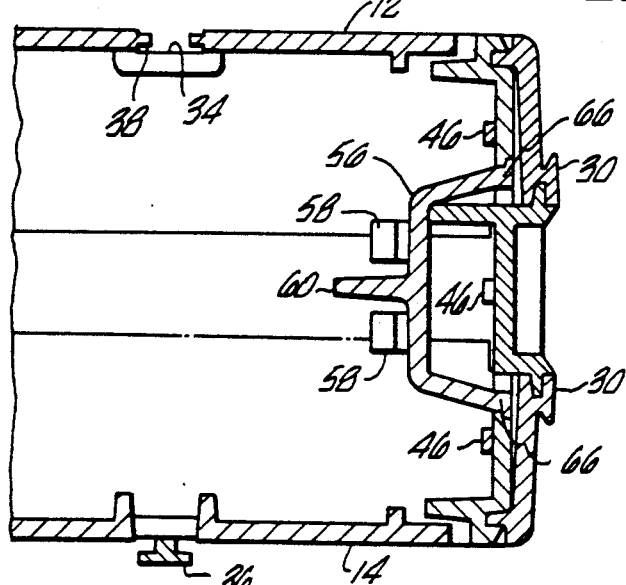
FIG. 4 is a cross-section through the module illustrating the position of the cassette insert.

The modules 10 are connected together in the vertical direction relative to one another by a series of grooves 34 on the exterior surface of the cap 12 and into which a plurality of T-shaped projections 36 from the adjacent module will slide. These T-shaped projections 36 extend out from the exterior surface of the bottom 14 and are illustrated in FIGS. 3 and 4. A plurality of flanges 38 extend over the grooves 34 and correspond to the position of the T-shaped projections 36 to hold them in the vertical direction.

As shown in FIGS. 2 and 3, the module 10 is sized and shaped to accommodate the storage of one single compact disc box 40 and one standard dual compact disc box 42. The compact discs 40 and 42 are stored at different levels or compartments, or stored in a compartmentalized manner, in the module 10 by a pair of shelves 44 positioned opposite one another on the right and left elements 18 and 20. The spacing between the interior surface of the cap 12 and the shelves 44 is approximately the thickness of a single compact disc box 40. The spacing between the interior surface of the bottom 14 and the shelves 44 is approximately the thickness of a standard dual compact disc box 42. The compact discs 40 and 42 are secured within the module 10 by engaging at least one pair of first biased spring means 46 which are biased inwardly to contact the compact discs 40 and 42 when moved into position on the shelves 44.

Figure 6:
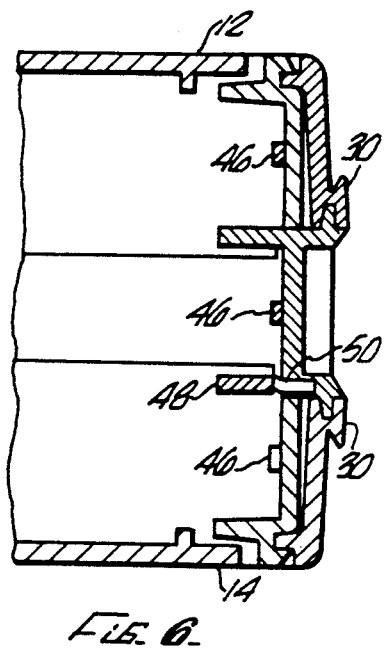
FIG. 6 is a cross sectional view of the module with the right element chosen to accommodate the storage of three single compact disc boxes.
Figure 7:
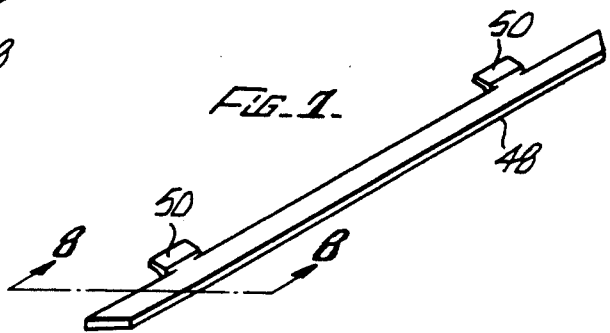
FIG. 7 shows the removable shelf illustrated in position in FIG. 6.

The module 10 may be adapted to house three single compact disc boxes 40 by the attachment of a pair of removable shelves 48 onto the right and left elements 18 and 20. The removable shelves 48, shown in FIG. 7, may be positioned as is illustrated in FIG. 6, so that the shelves 44 and the removable shelves 48 can store the three single compact discs 40 at three different levels in a compartmentalized fashion within the module 10. In the preferred embodiment, a series of recessed notches 50 are located on each of the right and left elements 18 and 20. The removable shelves 48 are coupled to their respective right or left elements 18 or 20 by attaching a portion of the removable shelves 48 into the respective recessed notches 50. Both of the removable shelves 48 may have at least one rib 52 thereon to securely hold the shelf 48 in place in the recessed notch 50.

Figure 5:
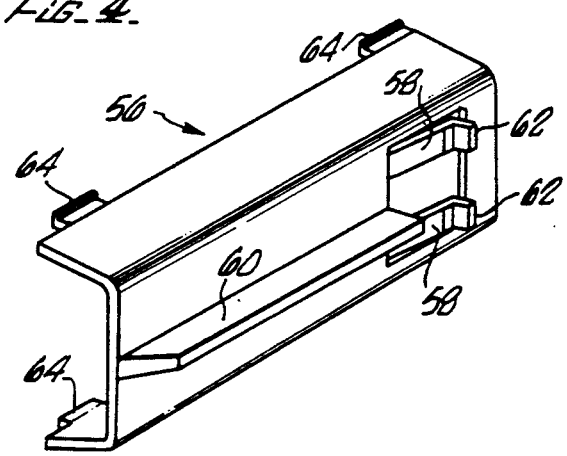
FIG. 5 is another view of the cassette insert to accommodate the storage of two audio cassette tape boxes.

The module 10 may also by adapted to house two standard audio cassette boxes 54. This is accomplished by attaching a pair of cassette inserts 56 onto the respective right and left elements 18 and 20 as illustrated in FIG. 4. The cassette insert 56 is comprised of a second biased spring means 58 and a cassette shelf 60 to secure the cassette boxes 54 in the module 10 as shown in FIG. 5. End stops 62 are also provided on the ends of the second biased spring means 58 to abut up against the cassette boxes 54. This is a necessary adaptation because the cassette boxes 54 are generally of a shorter length than the compact disc boxes 40 and 42. The cassette inserts 56 may be coupled to the right and left elements 18 and 20 by a series of complementary tabs 64 which are releasably attached to a plurality of connecting slots 66 on the right and left elements 40 and 42. The scope of this invention includes the adaptation of the module 10 to also store electronic media, including the respective packaging, other than compact disc boxes or audio cassette boxes.

Thus, a multiple media storage container and storage system is disclosed. While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. A multiple media storage container comprising a module for the compartmentalized storage of different recording media, including compact discs and audio cassettes and their respective packaging, and further comprised of right and left elements detachable from side walls of said module, said right and left elements comprising one or more pairs of opposing first or second biased spring means which releasably engage said different recording media to releasably secure said different recording media within said module.

2. A multiple media storage container comprising:
   (a) a cap and bottom defining a back wall and releasably secured to a right element and a left element to frame a substantially rectangular front aperture and forming a module, said module sized to accommodate the storage of both a conventional dual compact disc box and a single compact disc box;
   (b) a plurality of shelves extending from said right and left elements to provide, in the alternative, for the compartmentalized storage within said module of:

(i) one single compact disc box and one dual compact disc box,
(ii) three single compact disc boxes or
(iii) two standard audio cassette boxes; and (c) a plurality of biased spring means attached opposite one another to said right and left elements to mutually engage said compact disc boxes or said audio cassette boxes.

3. The container of claim 2 further comprised of means to accommodate the storage of compact discs and recording media other than compact discs.

4. The multiple media storage container of claim 1 or claim 2 further comprised of horizontal and vertical interconnecting means affixed to the exterior surface of said module to mate with similar modules in a vertical and horizontal direction to form a modular storage system.

5. A multiple media storage container comprising:
(a) a cap and bottom defining a back wall and releasably secured to a right element and an opposing left element to frame a substantially rectangular front aperture and forming a module;
(b) a plurality of shelves extending from said right element and said opposing left element and providing for the compartmentalized storage of one single compact disc box and one dual compact disc box;
(c) a plurality of first biased spring means positioned on said right and left elements so at least one pair of said first biased spring means mutually engages each of said compact disc boxes;
(d) a horizontal interconnecting means formed on the exterior surface of said module to horizontally interconnect the module with similar modules; and
(e) a plurality of grooves and flanges on the exterior surface of said cap corresponding to a plurality of T-shaped projections on the exterior surface of said bottom, said T-shaped projections sized to slidably fit within said grooves and be releasably secured by said flanges.

6. The multiple media storage container of claim 5 further comprising:
(a) at least one recessed notch positioned on each of said right and left elements;
(b) at least one pair of removable shelves, coupled to said right element and said left element in a corresponding fashion by engaging said recessed notches thereon and thereby providing for the compartmentalized storage within said module of three single compact disc boxes with a pair of said first biased spring means mutually engaging each of said compact disc boxes.

7. The multiple media storage container of claim 6 wherein said removable shelves are further comprised of at least one rib.

8. The multiple media storage container of claim 5 further comprised of:
(a) a pair of cassette inserts, coupled to said right element and said left element within said module and providing for the compartmentalized storage of two standard audio cassette boxes within said module;
(b) a plurality of second biased spring means attached to said cassette inserts and positioned thereon so at least one pair of said second biased spring means mutually engages each of said standard audio cassette boxes; and (c) a plurality of end stops connected to said second biased spring means to engage said standard audio cassette boxes.

9. The modular storage container of claim 8 where said cassette inserts are coupled to said right and left elements by a plurality of connecting slots and complementary tabs.

10. The modular storage container of claim 5, 6 or 8 wherein said horizontal interconnecting means is comprised of a channel and corresponding rail means.

11. The multiple media storage container of claim 5 wherein said module further comprises a lip positioned adjacent to said front aperture.

12. The multiple media storage container of claim 5 wherein said module is a unitary molded plastic piece.

13. A method for storage of multiple types of recording media in an interconnected system comprising the steps of:
(a) forming a module having a cap and a bottom forming a back wall and connected by interchangeable left and right side elements and defining a substantially rectangular front aperture;
(b) selecting the left and right side elements to compartmentalize the storage within said module of either one dual compact disc box and one single compact disc box, three single compact disc boxes or two standard audio cassette boxes;
(c) providing said cap with a plurality of grooves and flanges interspaced thereon; and
(d) providing on said bottom a plurality of T-shaped projections corresponding to said grooves and flanges of an adjoining module, whereas numerous modules may be connected together in a vertical and horizontal direction to form a storage system.

14. A method for storage of multiple types of recording media in an interconnected system comprising the steps of:
(a) forming a module having a cap and a bottom forming a back wall and connected by interchangeable left and right side elements and defining a substantially rectangular front aperture, said module sized to accommodate the storage of one dual compact disc box and one single compact disc box;
(b) selecting the interchangeable left and right side elements to compartmentalize the storage within said module of either three single compact disc boxes or two standard audio cassette boxes;
(c) providing said cap with a plurality of grooves and flanges interspaced thereon; and
(d) providing on said bottom a plurality of T-shaped projections corresponding to said grooves and flanges of an adjoining module.

15. A method for storage of multiple types of recording media in an interconnected system comprising the steps of:
(a) forming a standard sized module having a cap and a bottom forming a back wall and connected by interchangeable left and right side elements and defining a substantially rectangular front aperture, said module sized to accommodate the storage of one standard dual compact disc box and one single compact disc box;
(b) selecting the left and right side elements to compartmentalize the storage within said module of either one dual compact disc box and one single compact disc box or other recording media other than compact discs and securing the compact discs or the other recording media in said module by first or second biased spring means;

(c) providing said cap with a plurality of grooves and flanges interspaced thereon; and (d) providing on said bottom a plurality of T-shaped projections corresponding to said grooves and flanges of an adjoining module, whereas a vertically and horizontally interconnected system of modules forms a storage system for multiple types of recording media.

* * * * *